Figure 1:
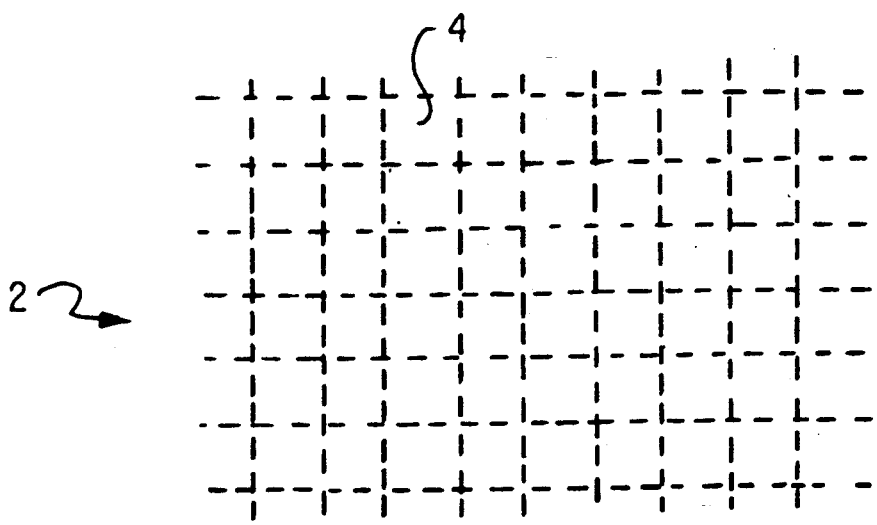

United States Patent [19]

Klayman et al.

[11] Patent Number: 5,097,624
[45] Date of Patent: Mar. 24, 1992

[54] NETTING FOR CROP PROTECTION

[76] Inventors: Avi Klayman, 27 Tagor Street, Tel-Aviv; Rina Kahan, 3 Sturman Street, Herzlia, both of Israel

[21] Appl. No.: 520,753

[22] Filed: May 9, 1990

[30] Foreign Application Priority Data

May 15, 1989 [IL] Israel ......................................... 90301

[51] Int. Cl.$^5$ .............................................. A01G 9/00
[52] U.S. Cl. ......................................... 47/31; 47/1.01
[58] Field of Search ............................................. 47/31

[56] References Cited

FOREIGN PATENT DOCUMENTS

| 0307986 | 3/1989 | European Pat. Off. | |
| 2835092 | 3/1979 | Fed. Rep. of Germany | 47/31 |
| 0220490 | 4/1985 | German Democratic Rep. | 47/31 |
| 582433 | 9/1958 | Italy | 47/31 |
| 0187656 | 10/1984 | Japan | 47/31 |
| 1216622 | 9/1986 | Japan | 47/31 |

Primary Examiner—Richard E. Chilcot, Jr.
Assistant Examiner—Joanne C. Downs
Attorney, Agent, or Firm—Oblon, Spivak, McClelland, Maier & Neustadt

[57] ABSTRACT

There is provided a netting produced from polymeric fibers, for use in fences for plant protection preventing invasion for insect pests, which netting has rectangular openings of from 0.25 mm to 0.35 mm in one dimension, and from 0.4 mm to 1.0 mm in the other dimension, with an open area of at least 40 percent of the area of the netting, the fibers having a diameter of about 0.2 mm to about 0.35 mm. The invention further relates to a method of crop protection, preferably against Bemisis Tabaci, where plots of land on which a crop is grown are surrounded by a netting as defined above. Also other insect pests are prevented from passing through such netting and from entering such cultivated plots.

5 Claims, 1 Drawing Sheet

NETTING FOR CROP PROTECTION

FIELD OF THE INVENTION

The invention relates to means for the reduction of crop damage by insects and for crop protection in general. The invention provides means for such protection without resorting to chemical substances, which are apt to contaminate the crops and bring about harmful results. Crop protection is provided by a special type of fence which keeps harmful insects out, yet provides adequate access for air circulation.

BACKGROUND OF THE INVENTION

Crop protection is nowadays mainly attained by means of a wide variety of pesticides. A large number of these is on the market, and they are highly effective. It is one of the drawbacks that crops tend to take up at least small quantities of such crop protection agents, and even if these are very small quantities, long-time effects are unpredictable and constitute a long range hazard. Some of the crop protection chemicals may cause over prolonged periods a wide variety of diseases and even malignancies. Furthermore, the growth of "organic crops" is gaining support, and these are grown under conditions avoiding the use of any synthetic chemicals.

The novel fencing means according to the invention are effective in greatly reducing the insect population of crop areas, yet provide adequate ventilation and air circulation.

SUMMARY OF THE INVENTION

The present invention relates to crop protection means and to a method of plant and crop protection based on the use of such means. The invention further relates to specific novel types of nettings for use in settiing up fences for crop protection.

Other and further aspects of the invention will become apparent hereinafter.

According to the invention there is provided a special type of net, advantageously produced from a plastic material, which has essentially rectangular openings of from about 0.25 to 0.35 mm times about 0.4 to 1.0 mm sides. A preferred material for the production of such netting is polyethylene or another polyalkylene such as polypropylene or the like. The nettings of the invention are advantageously produced from fibers of about 0.2 mm to about 0.3 mm diameter. It is advantageous to use fibers which comprise protective means against degradation by exposure to solar radiation. Experiments have shown that whereas hitherto agricultural cultures are sprayed daily or at longer intervals with crop protective chemicals, which are inherently dangerous to the person applying such chemicals as well as to the end user of the agricultural products (mainly vegetables, fruit and other crops), plots fenced in by fences made of such netting, require greatly reduced quantities of crop protection chemicals. Under some conditions it is possible to save up to about 95% of such pesticides. When "organic crops are desired, it is possible to obtain reasonable crop yields, which is nearly impossible when no crop protective chemicals are used, with no such protective means. Furthermore, it has been found that in some experiments, due to the elimination of insect pests, a crop increase by a factor of up to about 30 to 40% was obtained. The entirely surprising results of such crop protection by means of netting of the present invention were obtained in a series of experiments. These were carried out with nettings in the range set out above.

A preferred size of such netting is one produced from 0.23 mm diameter polyethylene fiber, to give a netting of 24/28 mesh per inch. Such a netting has openings of about $0.3 \times 0.83$ mm with an overall open area of about 46%. The fences erected had a height of from about 1.5 to about 3 meters height, with a cover on top. The fine mesh of the novel netting prevents intrusion by a large percentage of insect pests. The netting of the invention is preferably produced from monofilament fibers. The open area must be at least 40 percent of the area of the netting.

It is an important aspect of the invention that the openings are rectangular, and within the size limits set out above. Only rectangular openings have been found suitable as regards practical production within reasonable expense limits, and to afford the required protection, while allowing adequate ventilation. Many experiments were carried out with conventional netting of similar dimensions but of square form openings, and it was found that when such squares were small enough to prevent penetration of *Bemisia tabaci*, there was no adequate access of air and the development of the plants was impaired. The seemingly small difference—namely the use of rectangular openings of predetermined size and which constitute a predetermined percentage of the area of the netting—gives highly satisfactory crop protection results, with normal plant growth.

The nettings according to the invention prevent access of a wide variety of small insects and flies which cause extensive damage to vegetables and flowers. For example, the *Bemisia tanaci* insect, which is a carrier of the tomato yellow leaf curl virus and which causes extensive damage, especially to tomatoes, is prevented from penetrating plots on which such plants are cultivated. A substantial increase in crop yield can be attained and there is no need to use chemical plant protection agents, and contamination by these is obviated. The efficiency of a netting of $0.3 \times 0.83$ mm openings of the present invention for minimizing crop damage due to infestation of *Bemisia tabaci* was tested as follows:

A tent of 18 square meter area was set up, surrounded by a netting of the invention, and covered by plastic sheet.

The height of the netting was 150 cm, and inside this confinement there were set up four adhesive-traps of yellow color, at a level of 20 cm above ground. Similar traps were set up in a plot where red peppers and one where melons were cultivated, within a 200 meter radius from the enclosed area. The traps were replaced by fresh ones, as required, generally after 4 to 7 days. The tests were carried out in the autumn of 1988 and beginning of 1989.

There were also made temperature measurements, comparing the temperature inside the confined area and the outside. There was used a minimum/maximum thermometer, located at 60 cm from ground level in the shade, inside and outside the net.

It is feasible to fence-in areas of quite large sizes. The following results were obtained with a netting of the invention:

| AVERAGE NUMBER OF BEMISIA TABACI PER TRAP DURING TEST PERIOD | | | | |
|---|---|---|---|---|
| Date | Inside Net | Outside Net | Near Pepper | Near Melon |
| 28.8.-4.9.88 | 0 | 60 | 236 | 94 |
| 4.9.-8.9.88 | 0 | 130 | 425 | 331 |
| 8.9.-13.9.88 | 0 | 283 | 1197 | 456 |
| 13.9.-17.9.88 | 0 | 204 | 740 | 315 |
| 17.9.-24.9.88 | 2 | 559 | 1559 | 598 |
| 24.9.-29.8.88 | 1.5 | 504 | 976 | 599 |

As regards temperature, it was found that the maximum temperature inside the net was higher by about 4 degrees Celsius compared with the outside. The minimum temperature at night is similar to that on the outside.

We claim:
1. For use in agriculture for the protection of growing plants against insect damage, in the form of a fence which protects a plot of such growing plants, a netting made of monofilament polyalkylene fibers of a diameter of from 0.2 mm to about 0.35, which netting has a mesh size of from 0.25 mm to 0.35 mm by about 0.4 mm to 1.0 mm, which netting has an open area of from 40 to 60 percent of such netting.
2. A fence of from 120 cm to about 400 cm height, made from a woven nonfilament netting having a 40 to 60 percent open area and rectangular meshes, as claimed in claim 1.
3. A method of plant protection against insects of the type of *Bemisia tabaci*, which comprises establishing around a plot of growing plants a netting claimed in claim 2.
4. A method as claimed in claim 3, where the growing plants are vegetables or flowers.
5. A method according to claim 4, where the vegetables are tomatoes or cucumbers.

* * * * *